United States Patent [19]

Talalay

[11] 4,147,825

[45] Apr. 3, 1979

[54] POLYMERIC FOAM CUSHIONING ARTICLE AND METHOD FOR MAKING THE SAME

[76] Inventor: Anselm Talalay, 2867 Ludlow Rd., Cleveland, Ohio 44120

[21] Appl. No.: 826,828

[22] Filed: Aug. 22, 1977

Related U.S. Application Data

[63] Continuation-in-part of Ser. No. 613,612, Sep. 15, 1975, abandoned.

[51] Int. Cl.² .......................... B32B 3/10; A47G 9/00
[52] U.S. Cl. ..................................... 418/138; 5/337; 428/71; 428/76; 428/311; 428/315; 428/425; 428/906
[58] Field of Search ................... 428/71, 76, 137, 138, 428/311, 315, 425, 906; 5/337, 338; 156/184, 191, 194, 213, 216, 217, 227

[56] References Cited

U.S. PATENT DOCUMENTS

| | | | |
|---|---|---|---|
| 2,688,070 | 8/1954 | Freedlander | 428/315 |
| 2,878,153 | 3/1959 | Hackländer | 428/315 |
| 3,047,888 | 8/1962 | Shecter et al. | 428/315 |
| 3,221,356 | 12/1965 | Schirmer | 156/217 |
| 3,222,695 | 12/1965 | Brown | 5/337 |
| 3,290,704 | 12/1966 | Willis | 5/337 |
| 3,394,414 | 7/1968 | Unger | 5/337 |
| 3,446,691 | 5/1969 | Mundie | 156/203 |
| 3,471,350 | 10/1969 | O'Berry et al. | 156/184 |
| 3,530,020 | 9/1970 | Lieberman | 5/337 |
| 3,555,580 | 1/1971 | Willis | 5/337 |
| 3,746,592 | 7/1973 | Nystrand | 156/227 |
| 3,849,225 | 11/1974 | Haertle | 156/213 |
| 3,858,257 | 1/1975 | Young | 5/337 |
| 3,927,504 | 12/1975 | Forrister | 428/906 |
| 3,937,425 | 2/1976 | Harvey | 156/217 |

FOREIGN PATENT DOCUMENTS 1273259 5/1972 United Kingdom ..................... 5/337

Primary Examiner—William J. Van Balen
Attorney, Agent, or Firm—Teare, Teare & Sammon

[57] ABSTRACT

A cushioning article, such as a pillow or the like, having good comfort and support qualities with reduced material waste made from open-cell polymeric foam materials. The article may be made from a single strip-like piece of such material of a step-wise decreasing width construction, by wrapping and securing the strip to provide a closed multi-layered structure, to provide a composite, unitary structure of stereo-elliptical shape. The multi-layered construction is comprised of a layered combination of conventional and high-resiliency polyurethane foam having a predetermined number of apertures in at least some of the layers.

6 Claims, 13 Drawing Figures

POLYMERIC FOAM CUSHIONING ARTICLE AND METHOD FOR MAKING THE SAME

This application is a continuation-in-part of my co-pending U.S. application, Ser. No. 613,612, filed Sept. 15, 1975, now abandoned.

BACKGROUND OF THE INVENTION

The present invention relates to a cushioning article, and more particularly relates to an improved construction and method for making a cushioning article having good comfort and support qualities with reduced material waste. For example, in the present invention, the cushioning may be employed in furniture seat and back cushions and headrests, and throw cushions, or the like. The invention is particularly suited for production of a bed pillow.

A comfortable sleep-inducing support for a person's head, such as a bed pillow, must meet several demanding criteria. For example, the pillow must be of a shape to conveniently receive a person's head. It must feel soft to initial contact, while at the same time provide adequate support. It should be air permeable to allow the body heat to be dissipated. It should have resilience so that it can be restored to an initial shape when a person raises his head from a pillow. At the same time, resiliency should not be such that the pillow will "fight back" when one is attempting to seek comfort and rest for the head. The achievement of the aforesaid criteria in one pillow at an economical cost with readily available material has been a problem.

In the past, comfortable pillows have been obtained traditionally by filling a sewn case with selected down or feathers from various fowl. Goose down was considered, for example, the most desirable. The resultant bed pillow readily conformed to a person's head. This was accomplished in part by compaction of the feathers, and in part by a shifting of the filling material so as to provide the gentle cradling of the head with the desired degree of softness, support, and selected amount of resiliency. The pillow was capable of being returned to its original condition after use by the simple process of being "fluffed." However, the scarcity and high cost of feather and down has resulted in the need for an acceptable substitute for the conventional pillow.

One approach was to attempt to utilize synthetic fibers to simulate the natural feathers and down. In this regard, synthetic fibers, such as of polyester polymers, were produced to provide a variety of fiber fillings for bed pillows. The fiber filled pillow, however, had a serious disadvantage in that the synthetic fibers did not possess the permanent resilience which were characteristic of the feather or down. As a result, such synthetic fiber pillows tended to matt and lose some of their usefulness after a comparatively short period of time.

Another approach was to use foam rubber, which was developed in the late 1930's. This was accepted as an upholstery material of superior comfort and great permanence, but in its original form, it was too firm for a bed pillow. In the late 1940's and early 1950's, a process for making latex foam rubber was developed (Talalay, U.S. Pat. No. 2,432,353) which was capable of consistently producing a foam rubber of sufficient softness and light enough density to provide a practical and comfortable pillow. As a result, in succeeding years, latex foam rubber pillows, made in accordance with the above invention, were utilized world-wide, partially, because of their durability and non-allergenic characteristics. While the latex form provided the best foam pillow, the price of the foam rubber was sufficiently high that the industry saw the need for the use of a less expensive material.

Flexible urethane foams, which were introduced into this country in the mid 1950's were of sufficiently low price that they began to have increasing acceptance in the furniture cushioning industry and in foam mattresses as a replacement for the foam rubber. While the flexible urethane foams did not have the resilience characteristics of the latex foam rubber, the price advantage of the flexible urethane foams was sufficient to result in the wide spread adaption of the material for the furniture cushioning and mattress industries. However, attempts have been unsuccessful to make a satisfactory bed pillow by the use of such polyurethane foams.

One of the problems is that the filling of a foam pillow, whether latex or polyurethane, does not shift as does down or synthetic fiber. As a result, such foam pillows could not achieve stress-free cradling comfort for a person's head partially by rearrangement and partially by compression but rather had to rely entirely on deformation to achieve cradling comfort which is so important for the inducement of sleep. This shortcoming of foams in general was particularly a problem in using polyurethane foam, making polyurethane foam generally unacceptable for use in a pillow.

One of the particular difficulties of polyurethane foam relates to the difficulty of achieving the desired shape. The external shape of a pillow is important, and it is well known that the proper shape for a bed pillow is one which, in cross section in both the length and widthwise directions, is in the form of a flattened ellipse. Such shape is hereinafter referred to as a stereo-elliptical shape, but the production of such shape from polyurethane foam has been uneconomical. This is because it is extremely difficult to economically produce the desired stereo-elliptical shape from a large block of polyurethane foam without incurring a large amount of material waste. Moreover, automatic machinery capable of cutting a compounded curvature has not as yet been developed. As a result, multiple operations are required to even approximate the desired shape of the pillow.

A second problem with use of the polyurethane flexible foam material has been in achieving the desired balance between comfort and support. As employed herein, the terms "comfort" or "softness" mean the ability of the cushioning structure to deflect at the surface and conform to the body shape. This prevents a concentration of pressure on the body. The term "support" employed herein means the ability of the cushioning structure to hold the body in the relaxes position and allow free body movement by providing a firm base to push against. Support minimizes stress on the joints. The desired comfort or softness for a pillow for sleeping is provided if the pillow deflects 25% of its original height when a compressing load of 3 to 7 lbs. distributed over a flat plate 50 sq. inches in area is vertically applied to it.

While the pillow should be soft to initial contact, it still must be able to provide adequate support for the head. One parameter for such support is that the pillow would have sufficient resistance that, in order for the pillow to be compressed 65% of its original height, a load is required which is $2\frac{1}{2}$ to 3 times the load needed to compress it 25%.

The aforesaid support, which can also be referred to as the resistance of the pillow to "bottoming" is usually measured as the load at 65% deflection. The desired softness-to-comfort relationship can be expressed as the ratio of load at 65% deflection to the load at 25% deflection. Such ration, called SAG or SAC factor, provides an approximate slope of the curve above the usual softness reference point (i.e., 25% deflection). Such ratio defines not only the characteristic shape of the compression-deflection curve of the flexible foam material but also provides substantial information about the comfort providing capability of the material when employed for cushioning a person's head.

Conventional polyurethane foam did not have the desired load deflection characteristics. SAG factors at 1.5 to 1.9 were representative of the best polyether urethane foams based on polyoxypropylene ethertriols of 3,000 to 4,000 molecular weight and an 80-20 isomer ratio of toluene diisocyanate, as compared to SAG factors of 2.8 to 3.2 for soft latex foam rubber. Recently, high resiliency (HR) foams have been developed. These foams are based on high primary hydroxyl containing polyether triols and polymeric isocyanates. Because of the markedly different polymer structure, foams of this type have quite different cushioning properties from the conventional urethane foams. The modulus of the new HR materials is much lower for a given density, and their compression deflection curve more closely resembles that of latex foam rubber. Such HR foams have SAG factors of 2.5 to 2.8. However, such new materials have a disadvantage in that the HR foams are considerably more costly on the board foot basis then conventional polyurethane foams.

Another important aspect of the sleep inducing pillow is that it must have a high degree of air permeability. In other words, it must allow the body heat to be readily dissipated as the person's head changes position and induces a pumping action in the pillow. Since all foams are insulating materials, the body heat cannot be readily removed by conductance.

Polyurethane foam presents a particular problem in this regard, because of the relatively lower air permeability of polyurethane foam compared to that of the latex foam rubber. Many urethane formulations even produce a partially "hermetic" foam (partially containing closed cells) which has to be "crushed" by intensive rolling or pounding to remedy its tendency to feel sluggish. This is notably the case when attempts are made to produce a very soft foam, e.g., of a ILD below 8 or 10 lbs., needed to make a bed pillow.

One of the approaches has been to produce a somewhat firmer foam and to "convolute cut" it. This is done by distorting the material, in sheet foam, between rolls which are studded over their entire surface with pyramidal projections in such a manner that the projection of one roll corresponds to the absence of a projection on the other roll. A band knife arranged in parallel to the axis of the rolls and close to the nip on the exit side of the compression-distorted material cuts the material into two matching layers which have over their entire surface a convoluted configuration. As an example, a two inch thick pad may be cut into two convoluted layers, where the peaks are 1½" high and the valleys ½". Convolute cut material indeed possesses a lower ILD than the material from which it was cut. However, because of the concentration of stress on the tips of the pyramids when compressive and especially dynamic load is applied, the convoluted material tends to soften and collapse, i.e., lose height.

In the present invention, it has been found that an adequate reduction in initial ILD (an adequate increase in initial softness) for the creation of a satisfactory bed pillow can be accomplished by perforating the polyurethane material, rather than by convoluting it. Preferably, the holes (perforations) have a cross-sectional diameter between ⅛" and ½" and an equidistant spacing from ¾" to 1½". By this arrangement, the percentage of surface area that has been removed is not more than 30%. In the invention, it has been found that perforation in the above manner not only (a) increases the air permeability of the pillow, and (b) breaks up the surface tension of the foam blank in such a manner that deformation of the pillow under localized load does not extend to the entire surface, (a very important feature in reducing "fight back") but also permits to lower the ILD of the material without seriously affecting the ability of the material to withstand dynamic loading. Thus, in comparing a convoluted and a perforated foam by subjecting them to the Dynamic Fatigue Test, ASTM Designation D 1564-71, Suffix H, Procedure 8 (Dynamic Fatigue by the Roller Shear at Constant Load), it is found that after 20,000 cycles a convoluted Polyether urethane foam with an original ILD of 6 to 9 lbs. has lost 13% of its height, while a perforated material has lost less than 6%.

SUMMARY OF THE INVENTION

The present invention provides a new and novel cushioning article, and more particularly relates to a bed pillow which combines all of the essential requirements for optimum application, including good comfort and support properties, good air permeability (breathability), absence of "fight back," and relative freedom from dynamic fatigue. The article of the present invention can be efficiently produced by readily available equipment in quantity, with a minimum of waste. More particularly, the cushioning article of the present invention comprises a multi-layered construction including, in combination, layers of conventional and high-resiliency polyurethane foam material. The cushioning article utilizes a plurality of predetermined spaced apertures of selectively reduced diameter in at least certain of the layers. The cushioning article is made from a strip like piece of such material and has a step-wise configuration of predetermined progressively reduced widthwise dimension disposed toward the interior of the article with the outer layer and/or layers being secured together along the associated periphery to form such stereo-elliptical shape.

DESCRIPTION OF THE PREFERRED EMBODIMENTS

Figure 1:
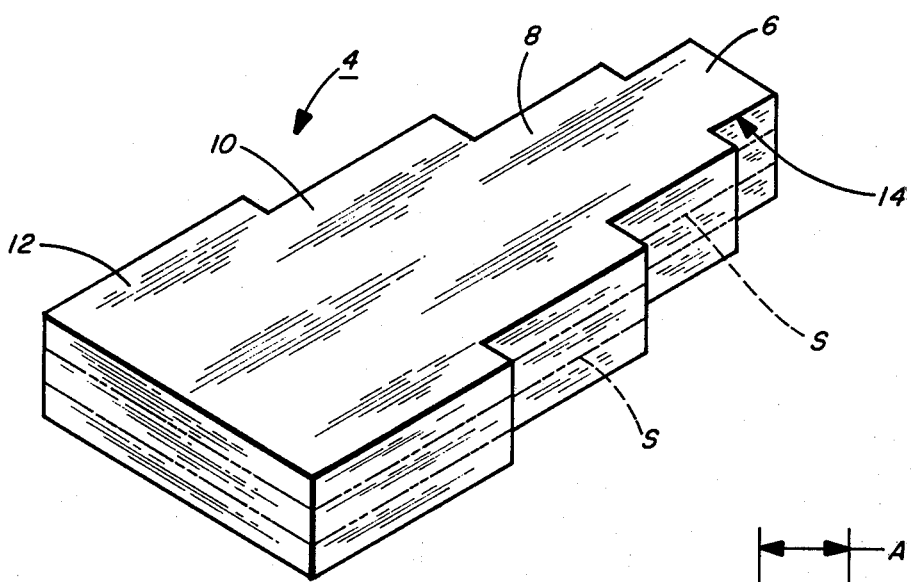
FIG. 1 is a generally perspective view illustrating a block of material having a reduced step-wise construction of the type which may be employed in one form of making the cushioning article of the present invention.
Figure 3:
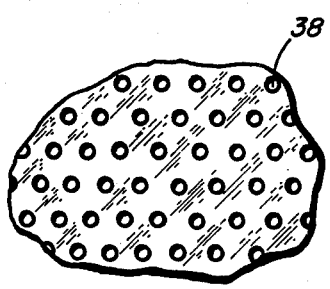
FIG. 3 is an enlarged fragmentary view illustrating one embodiment of the pin coring system of the present invention.
Figure 2:
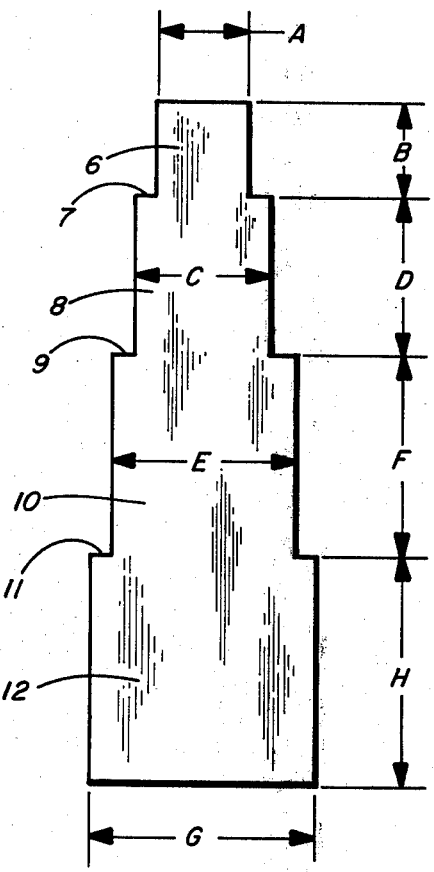
FIG. 2 is a top plan view of the block of material of FIG. 1.
Figure 4:
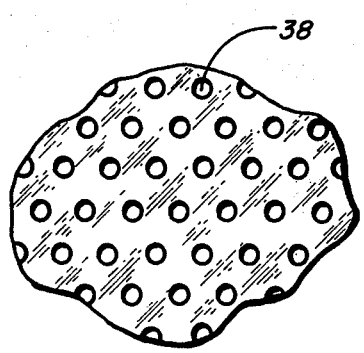
FIG. 4 is an enlarged fragmentary view illustrating another embodiment of the pin coring system of the invention.
Figure 7:
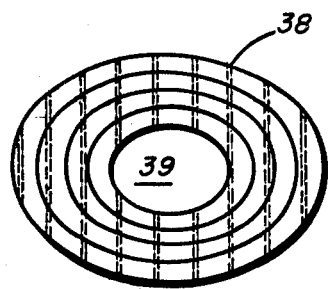
FIG. 7 is an end elevation view illustrating one embodiment of the pin coring system in one form of the invention.
Figure 8:
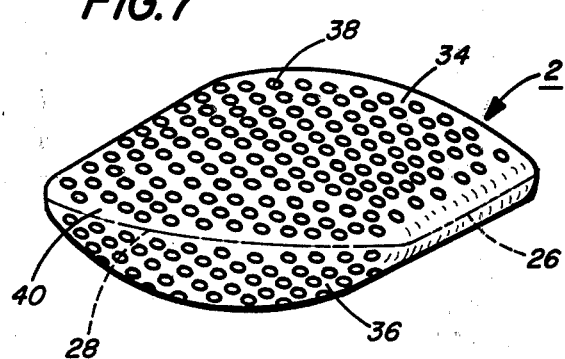
FIG. 8 is a generally perspective view of the finished cushioning article in the form of a pillow made in accordance with the invention.

Referring again to the drawings, and particularly to FIGS. 1 to 8, there is illustrated one embodiment for making the cushioning article, such as a bed pillow, designated generally at 2 in FIG. 8. In the form shown, the article 2 is made from a block 4 (FIG. 1) of open-cell polyurethane foam material. The block 4 may be produced on a continuous flexible foam slab line, by pouring on a moving conveyor, known in the art. As shown, the block 4 has a step-wise configuration of reduced transverse dimension defined by polygonal, such as rectangular, sections 6, 8, 10 and 12. To produce a bed pillow measuring 25" × 16½", having a maximum thickness at the crown (of 7") and elliptical cross-section, both in the length and the width-wise dimensions, the respective sections 6 to 12 preferably have dimensions of 18½" × 10" (AB), 21½" × 26" (CD), 24½" × 32" (EF), and 27½" × 38" (GH), as best seen in FIG. 2. This provides an overall length of approximately 106" which diminishes in width-wise dimension from 27½" to 10" in respect to the longitudinal center-line of the block. In making the pillow, after maturing and crushing, to increase the inter-communication of the cells, the block 4 may be horizontally sliced into approximately 1" thick sheets, as illustrated in doted-lines S of FIG. 1. In this form, the article may be produced by rolling one of the sliced sheets, as at 14, FIG. 6, upon itself into a generally flattened elliptical shape and securing, such as by cementing, the outer layer to itself on three sides along the article's outer central periphery or equator.

Figure 5:
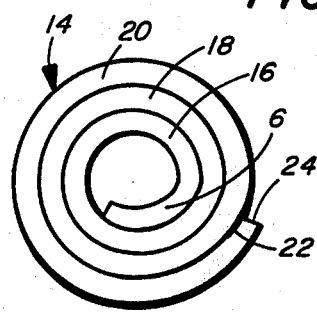
FIG. 5 is an end elevation view illustrating a single strip-like piece of material wrapped radially in one embodiment of making the cushioning article.
Figure 6:
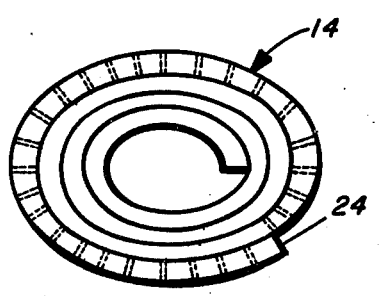
FIG. 6 is an end elevation view illustrating another step in forming the cushioning article.

More specifically, and with reference to FIG. 5, the strip-like piece 14 may be radially wrapped on a circular rotating mandrel (not shown) which may have, for example, a diameter of 10". In carrying out this operation, the section 6 forms the inner equatorial plane, the section 8 the first interior layer 16, the section 10 the second interior layer 18, and the section 12 the outer layer 20. By this arrangement, this dimensional relationship provides the geometric result that as the diameter of the ellipse is increased 2", the circumference is increased by approximately 6". During this wrapping operation, each succeeding layer overhangs as at 7, 9, and 11, the underlying one by approximately 1½" on each side. After the outer layer has been secured to itself, such as by cementing, heat sealing or the like, the rolled-up blank is removed from the mandrel, such as by collapsing or deflating it. This cementing is illustrated, as at 22, in FIG. 5, to give the concentric disposition of the layers, as shown. To facilitate forming of the seam along the edge, as at 24, the edge may be beveled or chamfered prior to cementing to provide the finished beveled edge, as at 26 in FIG. 8. A small amount of adhesive material may then be sprayed into the internal diameter of the roll and the concentric circular structure collapsed in a manner that places the outer seam at the equator, or at the generally longitudinal plane of the article. Thus, collapsed, there is provided a radially wound structure, which, if viewed from the end, has the desired stereo-elliptical shape. Minor stresses built into the body will relax over a period of time. The lengthwise dimensions of the section H are now secured to themselves by cementing or heat sealing at the equator, as at 28 of FIG. 8, providing a smooth elliptical shape in the direction perpendicular to the first mentioned ellipse as seen in FIG. 6.

In the invention, the sections 6 and 8 (FIG. 1) and A,B-C, D (FIG. 2) only of the block 4 may be made of a high resilient (HR) polyurethane foam, while sections 10 and 12 (FIG. 1) and E, F-H, G (FIG. 2) may be made of conventional polyurethane foam material. The (HR) material may have the typical formulation indicated in table A, as follows:

TABLE A

| | |
|---|---|
| Polyoxypropylene Triol, 60% Primary Capped, Molecular weight 4,500 to 6,000 | 100 parts |
| Aromatic amine (e.g., duPont LD-813) | 3 to 5 parts |
| A di-methyl ethanol amine catalyst (such as Propamine A; T.M. Lencro Chemicals) | 0.5 parts |
| A triethylene diamine catalyst (such as DABCO 33 LV; T.M. Houdry Process Corp.) | 0.5 parts |
| Silicone DC 200/5 (T.M. Dow Corning-Silicone oil, 5 centistokes viscosity) | 0.4 parts |
| Water | 2 parts |
| A "mixed" or a "crude" isocyanate (such as Desmodur 44 VT-Index 100; T.M. Mobay Chemical Co., or Hylene TCPA-105 Index; T.M. duPont) | 34.2 parts |
| Trichlorofluromethane | 15 to 20 parts* |
| *sufficient to produce with chosen water level an open-cell foam of 1.1 to 2.0 lbs. per cubic foot density and a mean Indent Load Deflation (ILD) of 3 to 8 pounds at 25% and SAG factor in excess of 2.5 | |

In the invention the material contained in the step-wise progressively reduced 1" thick strip-like piece 14 (with the given dimensions) constitutes approximately 2574 cu.inches or 17.88 board feet (one board foot being one square foot, one inch thick). By comparison, to carve a pillow of the same size from a solid block of polyurethane foam (e.g., hot wire cutting, buffing, distortion-cutting or profile cutting) there would be required a starting block measuring at least 25" × 16½" × 7" thereby containing approximately 20 board feet of material. In such case, it is probable that in order to obtain a satisfactory bilateral profile, at least 5% more material would be needed, i.e., 21 board feet. It is apparent, therefore, from the present invention that a more economical method is provided requiring approximately 15% less material to obtain a pillow of comparable shape and size. As will be seen, the "carving" of a compound curvature into a soft foam is at best a very difficult task. It required not only complex machinery, but multiple operations. The widely used cutting of profiles with a hot wire is not readily applicable because of the residual smell.

Figure 10:
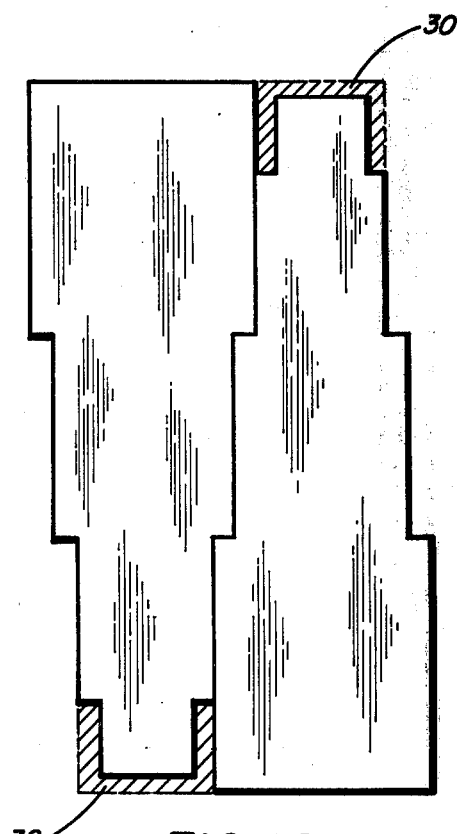
FIG. 10 is a top plan view illustrating another embodiment for producing the strip-like pieces for making the cushioning article in accordance with the invention.

In the invention, the step-wise reduced dimension strip-like piece can be economically obtained in a number of manners from a large continuously poured "bun" of polyurethane foam. For example, assuming that the "usable" thickness (or height) of the "bun" is 30 inches, then the sections 6, 8, 10 and 12 can be cut to provide individual 30" high blocks which can be cemented together to form the "masterblock" illustrated in FIG. 1 which, in turn, can be sliced on a band saw into 1" thick sheets. Alternatively, if it is desired to have a lesser number of cemented joints, the thick bun can be sliced first into 1" sheets of maximum size, and the step-wise tapered sections cut from such sheets with very little waste by alternating the direction of taper, as seen in FIG. 10. In this case, the waste area, as at 30 and 32, represents only a small fraction of the usable material area.

As a further example, a pillow 25" × 16½" × 7" may be produced in the same manner as aforementioned, except that the "bun" prior to cutting into blocks 4 or slicing into 1" layers is reticulated to yield a more open-pore, viz., a more air-permeable material. This may be accomplished, (e.g., in accordance with U.S. Pat. No. 3,297,802 or 3,175,030) by permeating the foam with a flame explodable mixture of fuel and oxygen, and sparking it to "blow out" the window membranes between the cells in the foam.

In another example, the pillow may be produced as aforementioned, except that one or more of the sections 6, 8, 10 and 12, e.g., after slicing is provided with a plurality of corings (perforations) formed in the "broadside faces" 24 and 36 (FIG. 8) of the article. Preferably, the cores have a cross-sectional diameter between ⅛" and ¼" and between approximately ¾" to 1½" equidistant spacing. By this arrangement, the "percentage void area" of the broadside faces is not more than 30%. The "percentage void area" of the perforated surface is derived by dividing the area of the surface removed as the result of the perforation by the area of the surface prior to perforation and multiplying the quotient by 100. As shown, the equatorial area, as at 40, of FIG. 8, may remain un-perforated if desired. The result of the perforation is two-folds: (A) to increase the air-permeability of the pillow, and (B) to break up the surface tension of the foam blank in such a manner that deformation of the pillow under a localized load does not extend to the entire surface. By this arrangement, the comfort characteristics of the foam pillow are enhanced. An added advantage is that a polyurethane pillow with a perforated surface can be slightly "crowded" into a pillow casing without producing unsightly surface wrinkles.

Polyurethane foams, especially when made with aromatic isocyanates tend to yellow on the surface when exposed to the U.V. component of the light spectrum. To reduce this tendency, which detracts from the esthetic appeal of the product, the polyurethane material used in this embodiment may have its outer layer protected with an U. V. light absorber, alone or in combination with a synergist. As an example, one part each of benzoic acid hydrazide; tetrakis [methylene 3-(3',5'-di-tert-butyl-4'-hydroxyphenyl) proportionate] methane (Irganox 1010-T.M. Ciba-Geigy): and Tinuvin 328 (T.M. Ciba-Geigy for a substituted benzotriazole) can be used for each 100 parts of polyurethane foam formulation remaining after the reaction. The additive can be dissolved or finely dispersed in one of the components of the formulation, or it can be applied by spraying to the surface of the fabricated pillow. In any case, it is sufficient to associate the additive only with the outer layer or surface of the pillow.

Figure 11:
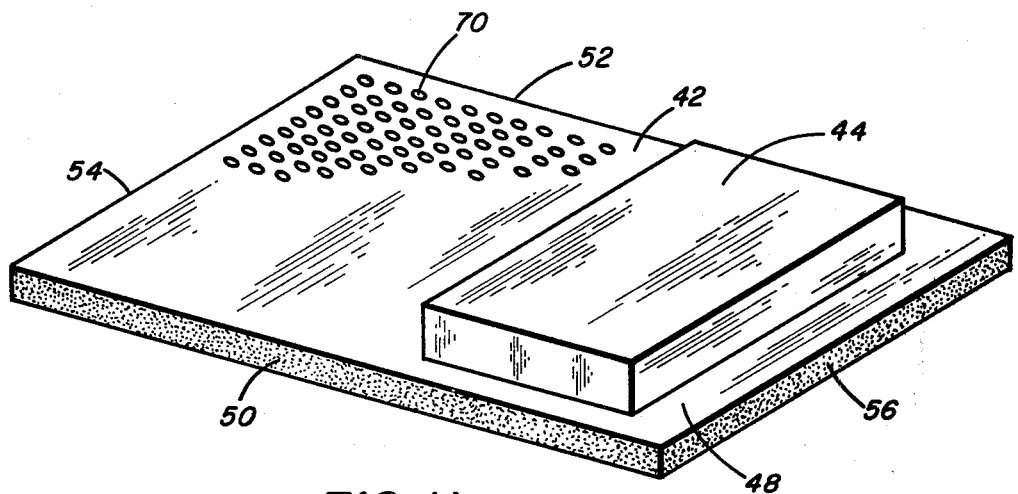
FIG. 11 is a generally perspective view illustrating another embodiment for making the cushioning article of the present invention.
Figure 12:
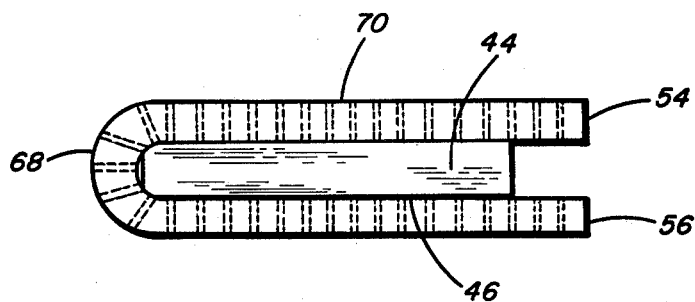
FIG. 12 is an end elevation view illustrating another step in making the cushioning article of FIG. 11.
Figure 13:
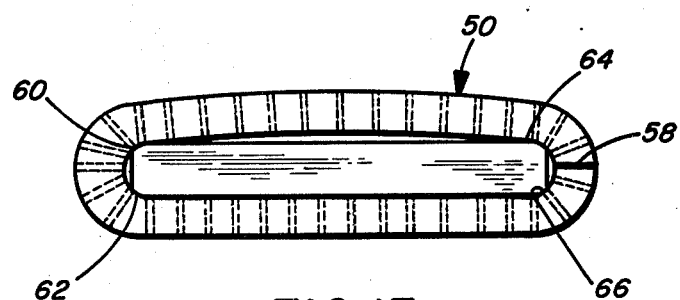
FIG. 13 illustrates the final step in making the cushioning article in FIGS. 11 and 12.

In FIGS. 11 to 13, there is illustrated another embodiment for making the cushioning article, designated generally at 50 in the present invention. In this form, an open-call polyurethane strip-like piece 42 is provided in slab form in a polygonal, such as rectangular, configuration. In this form, the strip had dimensions of approximately 24½" × 33" × 1.5" to which was secured adjacent one end an insert member of polygonal, such as rectangular, configuration having dimensions of 11½" × 20" × 3". The insert member 44 was adhesively secured, as at 46, to the piece 42, e.g., by spot-cementing the same to the piece 42 adjacent one end so as to provide approximately 2" margins, as at 48, on three sides thereof. The member 44 preferably has a thickness equal to or less than the doubled thickness of the piece 42. The strip-like piece 42 was then wrapped (clockwise, FIG. 12) upon itself so as to be disposed in covering relation over the insert member 44. Thus disposed oppositely disposed edges 51 and 52 (FIG. 11) are brought into face-to-face relation and pinch-cemented together, whereas the confronting end edges, as at 54 and 56, are pinch-cemented together to provide a smooth joint, as at 58, (FIG. 13), to provide the finished cushioning article 50. In this form, as the piece is wrapped upon itself, the confronting interior corners, as at 60, 62, 64, and 66, are yieldably collapsed due to the softness of the material giving a generally elliptical (cross section) to the finished article. Hence, the article is defined by a closed bight portion 68 at one end with a rounded joint end 58, as aforesaid. As indicated, the insert member 44 may be spot-cemented, as at 46, to the confronting interior surface of the piece 42, whereas the entire periphery of the side edges 50 and 52, as well as that of the end edge 56, may be lightly sprayed with an air setting cement to provide the desired edge pinch-cemented joints on three sides of the article.

Either the piece 42 or the insert member 44 or both may be made from the high resiliency (HR) polyurethane material, as aforesaid. However, in this form the insert member 44 may be made of high resiliency polyurethane, whereas the piece 42, as well as sections 6 and 8, may be made from a conventional polyether polyurethane foam which is perforated or unperforated, as desired. In such case, the foam may have a typical formulation as set forth in Table B, as follows:

TABLE B

| Comment | Parts by Weight |
| --- | --- |
| Polyol (Trifunctional) | 100.0 |
| Toluene Diisocyanate | 46.0 |
| Organo Tin Catalyst | 0.4 |
| Silicone Surfactant | 1.0 |
| Tertiary Amine Catalyst | 0.2 |
| Water | 2.0 - 3.5 |
| Monoflurotrichloromethane | 10.0 - 15.0 |

A conventional polyether foam suited for bed pillow application may have a density of 0.9 to 1.0 pounds per cubic foot; an indent load deflection (ILD), as measured in accordance with ASTM D-2406-68, of 4 to 7 pounds; and a ratio of 65% deflection load to 25% deflection load (SAG factor) of 1.7 to 1.9.

Figure 9:
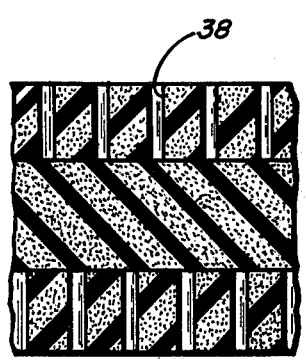
FIG. 9 is an enlarged fragmentary section view illustrating another embodiment of the pin coring arrangement.

In either case, the piece 42 may be provided with a pin core apertures, or perforations 70, which, as illustrated in FIGS. 12 and 13, extend completely through the piece. In this case, the pin cores may have the same dimensions and "percentage void area" relationship as described in connection with the article illustrated in FIG. 8. Further, it is recognized that the pin cores 38 and 70 may be disposed in aligned relation with one another, as seen in FIGS. 7 and 12, or they may be disposed in a staggered pattern, as seen in FIG. 9, so as to provide the desired "percentage void area." As seen in FIGS. 6 and 7, for example, the pin cores 38 may be provided in the outermost layer 20, or may be provided in aligned relation in all of the superposed layers so as to communicate with the cavity 39 (FIG. 7) defined by the closed structure. It has been found that such pin core perforation significantly improved the entire shape of load deflection curve. It is found that the perforation improves the initial softness of the pillow (reduces the load needed to achieve a small deflection) while leaving the support characteristics (load at high deflection) largely unaffected. As an example, perforation of both the elements 44 and 42 with ¼" diameter holes on a ¾" square pattern reduced the ILD of a pillow (HR foam of 1.5 pounds per cubic foot density) by 19.5% in the 10 to 15 percentage deflection range; by 14% in the 20 to 30% deflection range; and by only 6% in the 60 to 75% deflection range. Expressing the results in different terms, perforation of both layers 42 and 44 improved the initial softness ratio (ISR-see below) from 2.02 to 2.09, and the SAG (support) factor from 2.71 to 2.95. A factor which is analogous to the SAG factor is the initial softness ratio, or ISR which is provided by taking the ratio of the load at 25% deflection to a load at 5% deflection. In this case, a high value, which in this case indicates a softer initial feel, is desirable. Because conventional polyether foam is more economical to produce than high resiliency polyurethane foam, a particularly advantageous form of this invention is to make the piece 42 from conventional polyether urethane material and the insert member 44 from high resiliency (HR) urethane, with the (perferably perforated) outer layer providing the initial softness, and the (if desired, unperforated) inner layer providing the support.

It will be seen that various modifications and combinations of features of the invention may be made without departing from the scope of the present invention, as defined in the appended claims.

I claim:

1. A cushioning article having an improved balance of physical characteristics including good comfort and support properties, good air permeability, reduced "fight back" and relative freedom from dynamic fatigue made from polymeric foam materials comprising,
   a resilient body of multi-layered construction,
   said body including, in combination, conventional and high resiliency foam materials with said high resiliency foam material disposed interiorly of the outermost layer of said body,
   the outermost of said layers including a plurality of generally symmetrically spaced apertures having a diameter in the range from ⅛" to ½",
   said layers being reduced in a width-wise dimension in a direction toward the interior of said body, and
   the adjacent outer layers of said body being secured to one another along their associated peripheries to form a stereo-elliptical shape for said article.

2. A cushioning article in accordance with claim 1, wherein
   the innermost portions of said layers are made from a high resilient polyether urethane foam material having an indent load deflection of approximately three to eight pounds at 25% deflection, and a SAG factor in excess of 2.5.

3. A cushioning article in accordance with claim 2, wherein
   said polyether urethane foam material has a density between 1.1 and 2.0 pounds per cubic foot.

4. A cushioning article in accordance with claim 2, wherein
   the outer material of said layers made from a polyurethane foam material having a specific gravity of approximately one pound per cubic foot with an indent load deflection of approximately four to seven pounds at 25% deflection, and a SAG factor of approximately 1.7 to 1.9.

5. A cushioning article in accordance with claim 1, wherein
   said body is made from a continuous strip-like piece of open cell polymeric foam material,
   said strip-like piece being of an elongated configuration defined by marginal side and end edges,
   said strip-like piece being disposed in wrapped relation so as to define a plurality of generally concentric disposed layers,
   said strip-like piece being of a step-wise configuration of predetermined progressively reduced width-wise dimension extending in a direction from one end edge toward the opposite end edge thereof, the smallest reduced width-wise dimension being disposed innermost within said concentric relation,
   one of said end edges being secured to the confronting outer surface of the outermost one of said layers to define a generally symmetrical curved shape in the respective transverse and longitudinal cross-sections of said finished article.

6. A cushioning article having an improved balance of physical characteristics including good comfort and support properties, good air permeability, reduced "fight back" and relative freedom from dynamic fatigue made from polymeric foam materials comprising,
   a resilient body of multi-layered construction having an encapsulating polyurethane foam layer and at least one encapsulated high resiliency polyether urethane foam material,
   the encapsulating layer including a plurality of generally symmetrically spaced apertures having a diameter in the range from ⅛" to ½",
   the encapsulating layer of said body being secured to associated peripheries to form a stereo-elliptical shape for said article,
   said encapsulated high resiliency polyether urethane foam material having an indent load deflection of approximately three to eight pounds at 25% deflection, a sag factor in excess of 2.5, and a density between 1.1 and 2.0 pounds per cubic foot, and
   said encapsulating polyurethane foam material having a specific gravity of approximately one pound per cubic foot with an indent load deflection of approximately four to seven pounds at 25% deflection and a SAG factor of approximately 1.7 to 1.9.

* * * * *